W. C. KIRK.
POWER TRANSMISSION GEARING.
APPLICATION FILED FEB. 26, 1910.
983,452.
Patented Feb. 7, 1911.
2 SHEETS—SHEET 1.
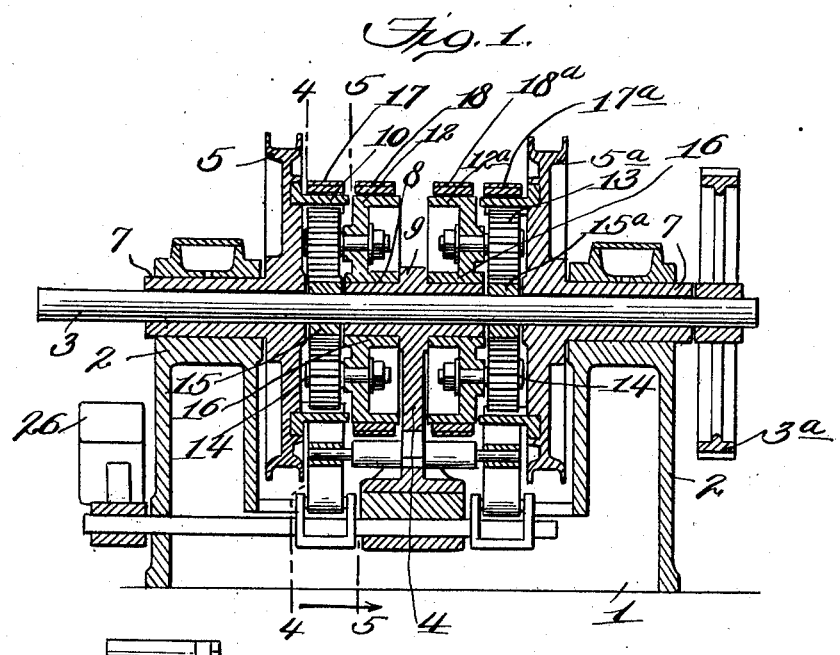
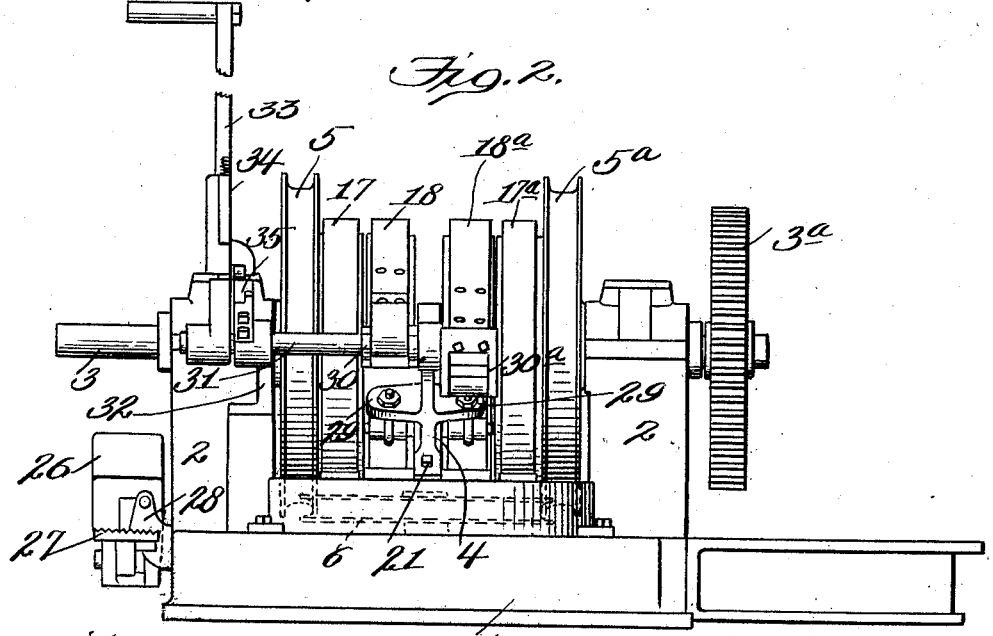
Witnesses:
Inventor
William C. Kirk
By James L. Norris
Atty

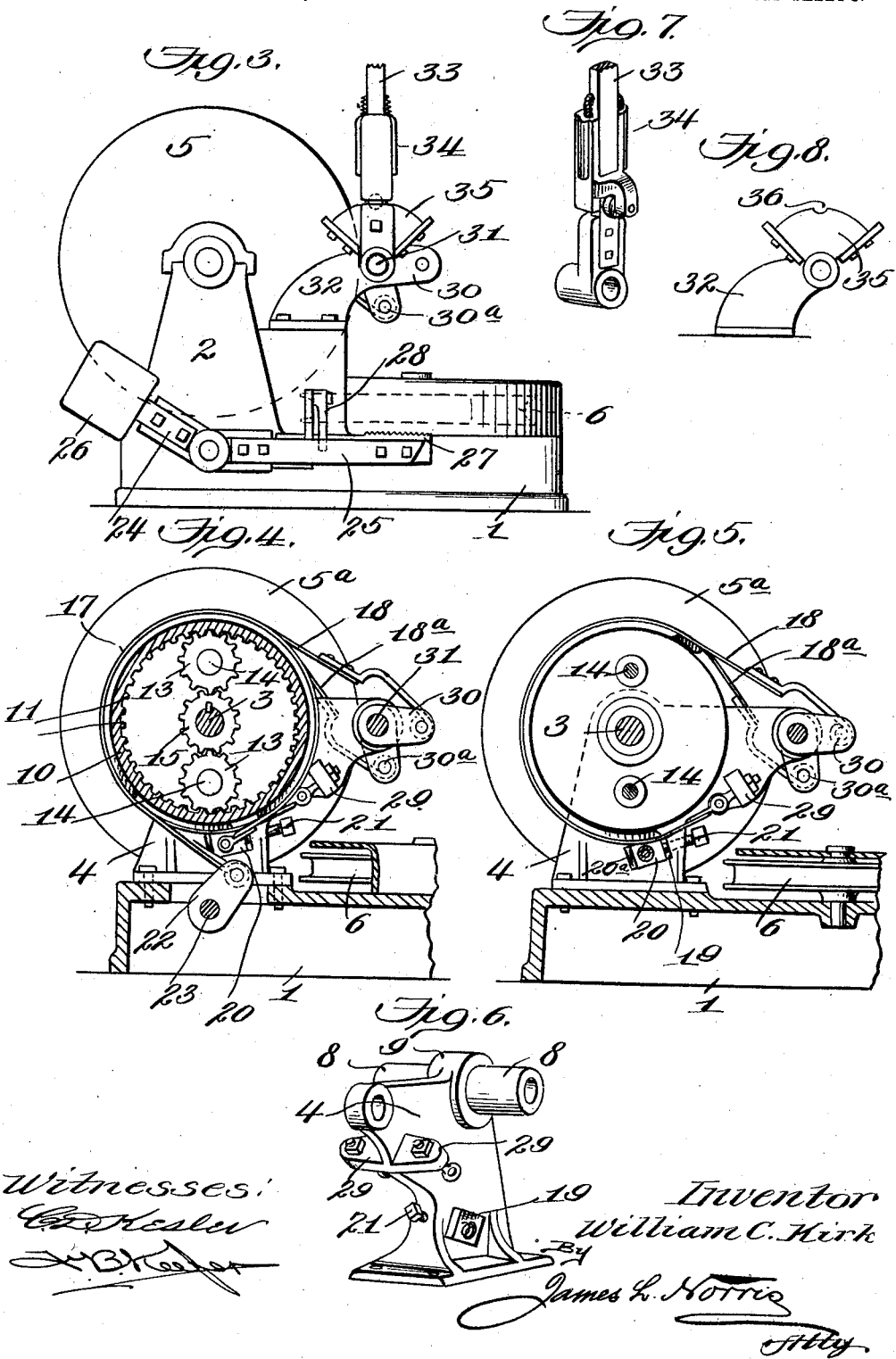

UNITED STATES PATENT OFFICE.

WILLIAM C. KIRK, OF CHATTANOOGA, TENNESSEE, ASSIGNOR TO PATTEN MANUFACTURING COMPANY, OF CHATTANOOGA, TENNESSEE, A CORPORATION OF TENNESSEE.

POWER-TRANSMISSION GEARING.

983,452.  Specification of Letters Patent.  Patented Feb. 7, 1911.

Application filed February 26, 1910. Serial No. 546,239.

*To all whom it may concern:*

Be it known that I, WILLIAM C. KIRK, a citizen of the United States, residing at Chattanooga, in the county of Hamilton and State of Tennessee, have invented new and useful Improvements in Power - Transmission Gearing, of which the following is a specification.

This invention relates to new and useful improvements in power transmission gearing and it proposes a system of planetary gearing wherein variable speed effects may be had by determinations of the degree of braking pressure applied to a wheel, herein termed for convenience, a " planet drum."

One object of the invention is the provision of a novel gear system of the type and for the purpose stated which is characterized by simplicity of assemblage, a reduction of friction to a minimum degree, and provision against the injurious effects of stresses.

A further object of the invention is a system of gearing of the type stated wherein the transmission parts and their adjuncts are assembled in a novel manner as a self-contained unit.

A further object of the invention is a system of gearing of the type stated wherein the relations of the parts are such that the speed may be regulated at any desired degree between zero and the maximum, with the utmost nicety and accuracy.

A further object of the invention is the provision, in combination with a gear system of the type stated, of novel controlling means possessing a number of intrinsically meritorious features.

Transmission gearing in accordance with the present invention may be advantageously employed in various connections. A specific application of the gearing and also an advantageous embodiment thereof, are disclosed in this specification. In each instance, *i. e.* of the embodiment and its application, the specific disclosure is by way of example and is not intended to put any limitation on the scope of the claims, not inherent in the language thereof.

In this specification the invention is disclosed in its application to a hoisting apparatus of the general type disclosed in the U. S. patents to Carl T. Painter, Nos. 818,115, granted April 17, 1906, and 870,458, granted November 5, 1907.

In the drawings wherein the exemplary embodiment and its application are disclosed with particularity: Figure 1 is a vertical transverse sectional view; Fig. 2 is a front elevation; Fig. 3 is a side elevation; Fig. 4 is a section on the line 4—4 of Fig. 1; Fig. 5 is a section on the line 5—5 of Fig. 1; Fig. 6 is a detail perspective view of a center bracket to be hereinafter described with particularity; Fig. 7 is a detail perspective view of a hand lever included as a part of the controlling mechanism; and Fig. 8 is a detail side elevation of a combined shaft supporting bracket and lever quadrant to be hereinafter referred to.

Similar characters of reference designate corresponding parts throughout the several views.

The apparatus is supported on a base 1, at each end of which vertical standards 2 are provided. The power shaft, as 3, is sustained by these standards and also by a bearing bracket, as 4, which, with regard to the present disclosure, may be aptly termed a " center " bracket, the word " center " being indicative of the relation of this bracket in the particular embodiment now under consideration.

The hoisting mechanism to which general reference has been made includes two sheaves 5 and 5ª, and a transfer sheave, as 6, which is horizontally disposed at the front portion of the base. The elevator or other cable (not shown) is passed, in the well known manner, one or more times around the sheaves 5, 6, and 5ª, the sheaves 5 and 5ª turning in opposite directions.

The sheaves 5 and 5ª have axially extended hollow hub journals, as 7, which take their bearings in the standards 2, and the shaft 3 is passed through the hub journals 7 and through the center bracket 4, having a bearing in, and being directly supported by the latter. The center bracket is bolted or otherwise secured to the base 1, and is provided with a horizontal tubular portion, as 8, through which the shaft 3 extends and at the center of which and in the plane of the body of the bracket, is a spacing rib or projection, as 9, for a purpose which will hereinafter appear.

Each of the sheaves 5 and 5ª is provided with an inwardly projecting flange, as 10, having its inner peripheral face formed with spur teeth, as 11. Each flange 10 is thus constituted a part of a planetary system.

With regard to the present disclosure, two coöperating planetary systems are employed, and the organization thereof includes, in addition to the internally toothed flanges 10, the "planet drums" previously referred to and designated by the numerals 12 and 12ª to indicate their relation to the sheaves 5 and 5ª, respectively. Each of the drums 12 and 12ª has associated therewith two or more planet wheels, as 13, these being disposed at the outer side of each drum and being mounted on horizontal, laterally projecting pins, as 14. The planetary organization also includes, as driving elements, spur wheels, designated by the numerals 15 and 15ª to indicate their relation to the planet wheels of the drums 12 and 12ª, respectively. The spur wheels 15 and 15ª are fast on the shaft 3, the wheel 15 meshing with the planet wheels of the drum 12 and these in turn meshing with the teeth of the flange of the sheave 5, and the wheel 15ª, in like manner, meshing with the planet wheels of the drum 12ª which in turn mesh with the teeth of the flange of the sheave 5ª. The planet drums are provided with cylindrical hubs, as 16, which rotatably surround the tubular portion 8 of the bracket 4 and the rib or projection 9 serves to maintain the drums in properly spaced relation. The center bracket thus, in addition to supporting the shaft 3, constitutes also a support and journal bearing for each of the drums.

The operation of each planetary system is controlled by two brake bands. In the present case, where the organization comprehends two coöperating and related planetary systems, four brake bands are employed. The brake bands for the flanges 10 are designated 17 and 17ª in accordance with their association with the respective sheaves 5 and 5ª and the brake bands for the drums 12 and 12ª are, in like manner, designated by the numerals 18 and 18ª.

The brake bands 17 and 17ª are, with relation to one another, applied and released in unison, while the brake bands 18 and 18ª are, with relation to one another, applied and released in alternation. It is accordingly of advantage to employ one means for operating the bands 17 and 17ª, and an additional means for operating the bands 18 and 18ª. Taking up first the adjuncts of the bands 17 and 17ª: The center bracket 4 is, as is clearly shown in Figs. 4 and 6, provided near its base, with a transverse rectangular opening, as 19, in which is adjustably fitted a transversely disposed block, as 20. The latter is held in any desired position in the opening 19, by an adjusting and retaining screw, as 21, and is spring pressed against said screw. The block 20 is provided at its ends with axially projecting pins to which ends of the bands 17 and 17ª are secured. The bands 17 and 17ª extend forwardly from the block 20, over the flanges 10, and their movable ends are secured to suitably constructed arms, as 22, which are provided on a transverse rocker shaft, as 23. The latter takes its bearings in the base 1, as shown in Fig. 1, and has an end portion which projects beyond said base and is provided with oppositely extending arms, as 24 and 25. The arm 24 is provided with a weight, as 26, and the arm 25 is provided with a treadle, as 27. The bands 17 and 17ª are held in a normal released position by the weight 26. When the treadle is depressed against the influence of the weight, the shaft 23 is rocked and said bands are applied. In order to hold said bands in their applied position, a laterally movable notched detent, as 28, is employed. The detent 28 is pivoted to a bracket arranged at the side of the base, as shown in Figs. 2 and 3, and is so shaped as to be moved inwardly by the arm 25 during its descent and to swing by gravity over said arm when the latter passes the notch in said detent. When it is desired to release the bands, the detent is moved out of engagement with the arm 23, the operator using his foot for this purpose, and the weight 26 restores the parts to normal positions. It will be apparent that the block 20 equalizes the tension of the bands 17 and 17ª and moreover, that the absolute maximum tension or pressure of said bands, may be regulated within certain limits, by disposing the block at a determined position in the opening 19. The adjustment of the position of the block 20 is effected by turning the screw 21. Positioning the block toward the rearward end of the opening by moving the screw inwardly, increases the absolute maximum pressure while positioning the block toward the forward end of the opening by moving the screw outwardly, decreases the absolute maximum pressure. When the screw is turned outwardly, the block is urged to follow the same by a spring, as 20ª, which is fitted in the opening 19.

Taking up now the bands 18 and 18ª and their adjuncts: The center bracket 4 is provided near its upper end, with a cross piece, as 29, to which ends of the bands 18 and 18ª are secured by suitable devices, e. g. eyebolts. The bands 18 and 18ª extend rearwardly from the cross piece 29, over the drums 12 and 12ª and their movable ends are connected to arms which are designated by the numerals 30 and 30ª to indicate their association with the respective bands 18 and 18ª. The arms 30 and 30ª are mounted upon a transverse rocker shaft, as 31, which takes its bearings in the bracket 4 and also in a bracket, as 32, arranged at one end of the base and shown in Figs. 2, 3 and 7. The arms 30 and 30ª project from the shaft 31, at a suitable angle to one another, such angle being preferably somewhat less than a right angle, as shown in Figs. 4 and 5. This disposition provides that the band 18 is in engagement with the drum 12 when the band 18ª is out of engagement with the drum 12ª, and vice versa. The shaft 31 has an end portion which projects beyond the bracket 32 and carries an upstanding hand lever, as 33. The latter is provided with a slidable spring-pressed roller carrying block, as 34, (Fig. 7) which is held against a quadrant, as 35, that is formed integral with or otherwise secured to the bracket 32 (Fig. 8). The quadrant 35 is provided with a central notch 36, in which the roller of the block 34 engages, to hold the lever and therewith its associated parts, in their intermediate or neutral positions. The pressure with which the roller is engaged in the notch, while of sufficient degree to guard against accidental movement of the lever as an incident of jars or stresses, does not interfere with the manual movement of the lever.

In operation: The shaft 3 is driven continuously in one direction from any suitable motor, a pinion, as 3ª, or it might be a belt wheel or other device, being provided as a transmission element. When the brakes 17 and 17ª are both applied and the brakes 18 and 18ª are both released (the lever 33 being in its intermediate position), the drums 12 and 12ª revolve idly on the hubs of the center bracket, in the same direction as the shaft 3. If it be assumed that the drum 12 is held stationary, while the drum 12ª is free, the sheave 5 is driven in an opposite direction to the shaft 3 and the sheave 5ª, consequent to the pull of the cable, is revolved in the same direction as said shaft and in an opposite direction to the sheave 5. If it be assumed on the other hand that the drum 12ª is held stationary, the sheave 5ª is driven in an opposite direction to the shaft 3 and the sheave 5, consequent to the pull of the cable, is revolved in the same direction as said shaft and in an opposite direction to the sheave 5ª. The reversal of the direction of rotation of the sheaves is effected by reversing the relation of the band brakes 18 and 18ª. A movement of the lever 33 to the right from its neutral position, (when the drawings only are considered) applies the brake 18 and releases the brake 18ª. In like manner a movement of the lever to the left applies the brake 18ª and releases the brake 18. The degree of speed of the sheaves 5 and 5ª is determined by the degree of pressure of the corresponding brakes 18 and 18ª. For example, when the brake 18 is applied with its maximum pressure, the sheave 5 attains its maximum speed, and if this pressure is sufficient to hold the drum stationary, said sheave will attain its absolute maximum speed. As the pressure of the brake is reduced, so also is the speed of the sheave reduced, as will be apparent. An easy and gradual reversing operation is thus provided for as well as any desired regulation of the speed of the driven sheave. In effecting the speed regulating or varying operations, the brakes 17 and 17ª may be advantageously employed in coöperation with the brakes 18 and 18ª, as will be apparent.

By reason of the manner in which the center bracket is related to the planet drums and the power shaft, friction is reduced to a minimum, and at the same time the injurious effects of stresses are prevented. For example, the stress incident to the application of the bands 18 and 18ª is taken up by the center bracket. The latter is thus not liable to distortion and it follows that the parts will always be maintained in proper alinement and relation. The construction is also of advantage in that the center bracket and the parts associated therewith, have a self-contained organization which provides for compactness of assemblage, more ready portability, greater ease in assembling and disassembling the machine, and the elimination of pressure or stresses, on the power shaft.

It will be understood that such designations as "power", "driven", "planet", and the like, occurring in the appended claims, are used in a relative and not an absolute sense, as the arrangement is peculiarly of such nature that the function herein assigned to the several parts may be interchangeably assigned to related parts, without materially affecting the basic principles of structure and operation which the invention comprehends. For example, the shaft 3 is termed the "power" shaft, simply because it is herein shown as the part from which the power is transmitted. It will be obvious that if desired the shaft 3 may, in certain cases, be employed as the part to which the power is transmitted without any departure from the aforesaid basic principles.

Having fully described my invention, I claim:

1. A power transmission system including a power shaft, a driven element rotatably surrounding the same and having an annular row of gear teeth, a bracket having a tubular portion through which the power shaft extends, a planet drum having a hub portion which surrounds the tubular portion as a bearing, gear wheels carried by the planet drum and in mesh with said gear teeth, a gear wheel fast on the power shaft and in mesh with said gear wheels and a braking device for the planet drum.

2. A power transmission system including a power shaft, a pair of driven elements rotatably surrounding the same, a center bracket having a tubular portion through which the power shaft extends, a pair of planet drums, each having a hub portion which is concentric to the tubular portion, the latter sustaining the drums, each driven element having an annular row of gear teeth, gear wheels carried by each planet drum for intermeshing engagement with the teeth of the adjacent driven element, a pair of gear wheels fast on the shaft and in intermeshing engagement with the pinions of the respectively adjacent planet drums, and a braking device for each planet drum.

3. A power transmission system including a power shaft, a pair of driven elements rotatably surrounding the same, a center bracket having a tubular portion through which the power shaft extends, a pair of planet drums, each having a hub portion which is concentric to the tubular portion, the latter sustaining the drums, each driven element having an annular row of gear teeth, gear wheels carried by each planet drum for intermeshing engagement with the teeth of the adjacent driven element, a pair of gear wheels fast on the shaft and in intermeshing engagement with the pinions of the respectively adjacent planet drums, a brake band for each planet drum, each brake band having a fixed end and a movable end, and means for simultaneously operating the brake bands comprising a transverse rocker shaft and a pair of arms secured thereto and to which the movable ends of the respectively adjacent brake bands are secured, the arms being disposed at an angle to one another.

4. A power transmission system including a power shaft, an element rotatably surrounding the same, and having an annular row of gear teeth, a second element surrounding the shaft, gear wheels carried by the second element and in mesh with the gear teeth, a gear wheel fast on the shaft and in mesh with the gear wheels of the second element, a brake band for one of the elements, the brake band having a fixed and a movable end, and brake band operating means comprising a rocker shaft having an arm to which the movable end of the brake band is attached, a weighted arm secured to the shaft to hold the same in a normal position, an operating arm secured to the shaft and a displaceable detent for engagement with the operating arm.

5. A power transmission system including a power shaft, a pair of elements rotatably surrounding the same, each of which has an annular row of gear teeth, a second pair of elements surrounding the shaft, gear wheels carried by the second elements and in mesh with the gear teeth of the respectively adjacent first mentioned elements, a pair of gear wheels fast on the shaft and in mesh with the gear wheels of the respectively adjacent second mentioned elements, a pair of brake bands for one of the pairs of elements, brake band operating means, a part having a rectangular opening, a block fitted in the opening and a screw threaded through the part and bearing against the block, the brake bands having ends secured to the block, and having ends associated with the operating means.

6. A power transmission system, including a power shaft, a pair of driven elements rotatably surrounding the same and each having an annular row of gear teeth, a pair of planet drums having their hubs concentric to the shaft, gear wheels carried by the planet drums and which mesh with the teeth of the respectively adjacent driven elements, a pair of gear wheels fast on the shaft and in mesh with the gear wheels of the respectively adjacent planet drums, a pair of braking devices for the driven elements and a second pair of braking devices for the planet drums, the first pair of devices being simultaneously operated in similar relations and the second pair of devices being simultaneously operated in opposite relations.

7. A power transmission system including a power shaft, a pair of driven elements rotatably surrounding the same and having internally toothed flanges, a center bracket having a horizontal tubular portion through which the power shaft extends, a pair of planet drums disposed between the driven elements and having hub portions rotatably surrounding the tubular portion, pinions carried by each planet drum and in mesh with the adjacent toothed flanges, pinions provided on the power shaft and in mesh with the pinions of the adjacent planet drum, a pair of brake bands for the driven elements, means for fixedly associating ends of the brake bands with the center bracket, operating means associating with the movable ends of the brake bands, a second pair of brake bands for the planet drums, means for fixedly associating the ends of the second brake bands with the center bracket, and operating means associating with the movable ends of the second brake bands.

8. A power transmission system including a power shaft, a pair of gear wheels fast thereon, companion elements associated in two pairs on said shaft, each pair of companion elements consisting of a driven element and a controlling element, one of the companion elements of each pair having an annular row of gear teeth, gear wheels carried by the other companion element of each pair and in mesh with the gear teeth of the first named companion element and with the adjacent gear wheel of the power shaft, and braking devices for the controlling elements.

9. A power transmission system including a power shaft and a gear wheel fast thereon, a driven element rotatably surrounding the power shaft and having an annular row of gear teeth, a planet drum constituting a companion element of the driven element and having a hub concentric to the driven shaft, gear wheels carried by the planet drum and in mesh with the gear teeth and also with the gear wheel on the power shaft, and a brake band for each of the companion elements, the brake bands being operated in opposite relations.

10. A power transmission system including a power shaft, a driven element rotatably surrounding the same, a bracket having a tubular portion through which the power shaft extends, a planet drum constituting a companion element of the driven element, one of the companion elements having a hub portion which surrounds the tubular portion as a bearing, gear wheels carried by the planet drum and in mesh with said gear teeth, and a gear wheel fast on the power shaft and in mesh with the gear wheels of the planet drum.

11. A power transmission system including a power shaft, a pair of gear wheels fast thereon, a pair of elements surrounding the shaft and each having an annular row of teeth, a second pair of elements also surrounding the shaft, forming companions of the respective first named elements, gear wheels carried by the elements of the second pair and in mesh with the gear teeth of the respectively adjacent first named elements and also in mesh with the respectively adjacent gear wheels of the power shaft, the elements of one pair having a controlling relation to the elements of the other pair, the latter being driven elements, brake bands for the controlling elements and having fixed and movable ends, and brake band operating means comprising a rocker shaft having angularly disposed arms to which the movable ends of the respectively adjacent brake bands are secured.

12. The combination with a pair of driven elements rotatable in opposite directions, of power transmission mechanism including a shaft which is concentric with the hubs of the driven elements, gear wheels fast on the shaft, a pair of controlling elements forming companions of the driven elements, the elements of one pair each having an annular row of teeth, gear wheels carried by the elements of the other pair and in mesh with the adjacent gear wheel of the power shaft and with the teeth of the adjacent companion element, and a braking device for each controlling element.

In testimony whereof I have hereunto set my hand in presence of two subscribing witnesses.

WILLIAM C. KIRK.

Witnesses:
ANNIE L. JOHNSON,
W. G. McMURRAY.